UNITED STATES PATENT OFFICE.

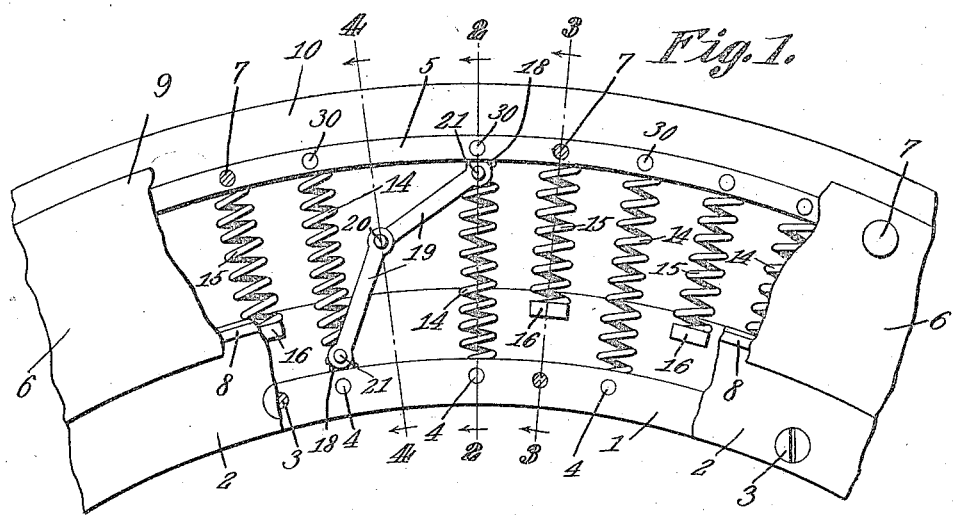

CHRISTIAN A. WAGNER, OF FORT PLAIN, NEW YORK.

TIRE.

1,424,223.                    Specification of Letters Patent.      Patented Aug. 1, 1922.

Application filed February 19, 1921. Serial No. 446,400.

*To all whom it may concern:*

Be it known that I, CHRISTIAN A. WAGNER, a citizen of the United States, residing at Fort Plain, in the county of Montgomery and State of New York, have invented a new and useful Tire, of which the following is a specification.

It is one object of this invention to provide a vehicle tire wherein pneumatic elements, subject to puncture and deterioration may be dispensed with. Another object of the invention is to provide novel means for securing the springs to the inner and outer rings of the tire. Another object of the invention is to provide novel means for relieving the springs of strain, when torque occurs between the inner and outer rings.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the drawings:—

Figure 1 shows in side elevation with parts broken out, a portion of a tire constructed in accordance with the invention; Figure 2 is a section on the line 2—2 of Figure 1; Figure 3 is a section on the line 3—3 of Figure 1; Figure 4 is a section on the line 4—4 of Figure 1.

The tire constituting this invention comprises an inner ring 1. Side plates 2 are applied to the inner ring 1 and are held thereon by securing elements 3 passing transversely through the ring 1 and cooperating with the side plates 2, as shown in Figure 3. Retainers 4 are mounted removably in the ring 1 and extend transversely thereof. The retainers 4 are held against endwise movement by the side plates 2 (see Figure 2).

The tire comprises an outer ring or band 5 to which side plates 6 are applied. The side plates 6 are held on the outer ring 5 by securing members 7 passing transversely through the ring 5 and engaging the side plates, as shown in Figure 3. The side plates 6 overlap the side plates 2 and the plates 2 carry packing strips 8, which, cooperating with the plates 6, prevent the entrance of dust and dirt into the interior of the structure. The strips 6 may project as at 9 beyond the outer ring 5, to form a seat for and to retain a tread 10 which may be made of solid rubber. The tread 10 is not a mandatory element, but may be resorted to in order to avoid noise.

Slots 11 are formed, in spaced relation to each other, in the outer curve of the inner ring 1, similar slots being fashioned in the inner curve of the outer ring, as shown at 12. Compression springs 14 extend between the rings 1 and 5. Short compression springs 15 project inwardly from the outer ring 5 and are spaced at their inner ends from the inner ring 1. The inner ends of the springs 15 carry feet 16 adapted to engage the inner ring 1 when the springs 14 are compressed beyond a predetermined point.

The springs 14 are provided with eyes 17 at each end. The springs 15 have eyes 17 at their outer ends. The eyes 17 at the inner ends of the springs 14 are received in certain of the slots 11 in the inner ring 1, the retainers 4 passing through the said eyes. The eyes 17 at the outer ends of the springs 14 are received in certain of the slots 12 and are engaged by the retainers 30 in the outer ring 5. The eyes 17 at the outer ends of the springs 15 are received in others of the slots 12 and are engaged by the securing members 7.

Brackets 18 are mounted on the rings 1 and 5. Any desired number of foldable ties are provided each comprising links denoted by the numeral 19. The inner ends of the links 19 of the tie are connected by a pivot element 20 and form a toggle-like connection between the bands. The outer ends of the members 19 are united by pivot elements 21 with the brackets 18.

In practical operation, the springs 14 are subjected first to compression. Under an increased load and before the convolutions of the springs 14 contact with each other, the feet 16 on the springs 15 come into contact with the inner ring 1 and carry a part of the load. A tie, comprising the members 19, will fold, to permit the springs 14 and 15 to exercise their functions. The tie may not always be necessary, but when the tire is used on the power driven wheel of a vehicle, the tie comes into play to prevent excessive strain on the springs 14 and 15, due to the torque existing between the rings 1 and 5.

Having thus described the invention, what is claimed is:—

In a device of the class described an inner ring, an outer ring, side plates carried by the respective rings, and overlapped slidably on each other, securing devices uniting the side plates with the rings, retainers removably mounted in the rings and held against endwise movement by the side plates, two series of coiled compression springs arranged between the rings, those of one series being longer than those of the other and attached at their ends to the respective rings, the shorter compression springs alternating with the longer and extended over and attached to the retainers of one ring and spaced from the other ring whereby the shorter springs operate to assist in supporting the load after a predetermined compression of the longer springs is obtained.

In testimony that I claim the foregoing as my own, I have hereto affixed my signature in the presence of two witnesses.

CHRISTIAN A. WAGNER.

Witnesses:
Fox Sponable,
Ida M. Nestell.